United States Patent
Ohno (10) Patent No.: US 10,203,514 B2
(45) Date of Patent: Feb. 12, 2019

(54) ELECTRIC LENS, OPTICAL UNIT, AND IMAGING DEVICE

(71) Applicant: Sony Olympus Medical Solutions Inc., Tokyo (JP)

(72) Inventor: Naoyuki Ohno, Tokyo (JP)

(73) Assignee: Sony Olympus Medical Solutions Inc., Tokyo (JP)

( * ) Notice: Subject to any disclaimer, the term of this patent is extended or adjusted under 35 U.S.C. 154(b) by 0 days.

(21) Appl. No.: 15/152,876

(22) Filed: May 12, 2016

(65) Prior Publication Data

US 2016/0363742 A1    Dec. 15, 2016

(30) Foreign Application Priority Data

Jun. 11, 2015   (JP) ................. 2015-118300

(51) Int. Cl.

| | |
|---|---|
| G02B 27/64 | (2006.01) |
| G02F 1/29 | (2006.01) |
| G02F 1/00 | (2006.01) |
| G02B 15/20 | (2006.01) |
| G02B 3/14 | (2006.01) |
| G02B 21/00 | (2006.01) |
| G02B 21/02 | (2006.01) |
| G02B 23/24 | (2006.01) |
| H04N 5/225 | (2006.01) |
| G02B 7/08 | (2006.01) |

(52) U.S. Cl.
CPC ............ *G02B 27/646* (2013.01); *G02B 3/14* (2013.01); *G02B 15/20* (2013.01); *G02F 1/0045* (2013.01); *G02F 1/29* (2013.01); *G02B 7/08* (2013.01); *G02B 21/0012* (2013.01); *G02B 21/025* (2013.01); *G02B 23/2438* (2013.01); *G02F 2001/294* (2013.01); *H04N 5/2254* (2013.01)

(58) Field of Classification Search
CPC  G02B 13/0075; G02B 3/0081; G02B 13/009; G02B 15/20; G02B 21/0012
USPC ........................................................ 359/315
See application file for complete search history.

(56) References Cited

U.S. PATENT DOCUMENTS

| | | | | |
|---|---|---|---|---|
| 4,820,028 A | * | 4/1989 | Suda ................. | G02B 15/16 359/676 |
| 6,437,925 B1 | * | 8/2002 | Nishioka ............ | G02B 3/14 348/E5.028 |
| 2010/0166413 A1 | * | 7/2010 | Hirao ................. | G02B 13/0025 396/439 |
| 2014/0111628 A1 | * | 4/2014 | Yoshino ............. | H04N 5/23296 348/65 |

FOREIGN PATENT DOCUMENTS

| | | |
|---|---|---|
| JP | 2005-129158 | 5/2005 |
| JP | 2013-61618 | 4/2013 |

* cited by examiner

*Primary Examiner* — Bumsuk Won
*Assistant Examiner* — Wen Huang
(74) *Attorney, Agent, or Firm* — Oblon, McClelland, Maier & Neustadt, L.L.P.

(57) ABSTRACT

There is provided an electric lens including a first lens and a second lens adjacent to each other, and a variable-refractive-index body that is held between a lens face of the first lens and a lens face of the second lens mutually having the same curved surface, and changes refractive index according to an externally applied electrical signal. A thickness of the variable-refractive-index body is uniform in at least a portion that transmits a light ray contributing to image formation.

12 Claims, 8 Drawing Sheets

ELECTRIC LENS, OPTICAL UNIT, AND IMAGING DEVICE

CROSS REFERENCE TO RELATED APPLICATIONS

This application claims the benefit of Japanese Priority Patent Application JP 2015-118300 filed Jun. 11, 2015, the entire contents of which are incorporated herein by reference.

BACKGROUND

The present disclosure relates to an electric lens, an optical unit, and an imaging device.

Imaging devices that focus an image of an object onto an image sensor using an optical system, and thereby generate a captured image of the object, are being used widely in a variety of fields. The optical system of such an imaging device is made up of a focus optical system for suitably focusing an image of an object onto the image sensor, and a zoom optical system for enlarging the image of the object. In these focus optical systems and zoom optical systems, a movable lens having a variable lens position is used, and by varying the position of the movable lens, the image of the object is focused, and the image of the object is enlarged as appropriate. In such focus optical systems and zoom optical systems, the focusing range and the zoom magnification factor greatly depend on the movable distance of the movable lens, and when attempting to achieve a wider focusing range or a high-magnification zoom, a large movable distance of the movable lens is set.

An example of an imaging device like the above is an endoscopic device as disclosed in JP 2013-61618A, for example. When attempting to achieve a zoom function as described in JP 2013-61618A in a device with fundamental size limitations in the imaging portion where the optical system is provided, such as an endoscopic device, making the allowable movable range of the movable lens are small as possible becomes important for miniaturization. However, if the allowable movable range of the movable lens is small, it may be impossible to achieve high-magnification zoom, and thus various innovations are demanded for further miniaturization.

To achieve miniaturization of the optical system, it is conceivable to use what is called a liquid crystal lens, in which liquid crystal is disposed between two planar lens substrates. This is because by applying an electrical signal to the liquid crystal to vary the refractive index of the liquid crystal, it becomes possible to vary the focal length of the lens without moving the lens itself. However, while the refractive index takes a larger value as the thickness of the liquid crystal increases, the resolution of the transmitted image unfortunately drops as the thickness of the liquid crystal increases. In addition, when attempting to apply such a liquid crystal lens to an imaging device with size limitations as disclosed in JP 2013-61618A, since the liquid crystal lens is additionally added to the optical system of the imaging device, the number of components increases, and further miniaturization may be impossible.

Meanwhile, JP 2005-129158A discloses technology that adjusts the degree of light scattering and convergence by using, in an optical system provided in an optical disc pickup device, a liquid crystal lens in which liquid crystal is provided in a convex lens shape between two spherical concave lenses.

SUMMARY

However, in the liquid crystal lens in which liquid crystal is provided in a convex lens shape between spherical concave lenses as disclosed in JP 2005-129158A above, the lens face of the spherical concave lenses sandwiching the liquid crystal has a curved surface with a concave shape. Consequently, a large refractive index is obtained at the lens face, and although further miniaturization of the optical system may be possible, given that the liquid crystal has a convex lens shape, the thickness of the liquid crystal is not constant in the direction parallel to the optical axis, and it is difficult to obtain a uniform refractive index over the liquid crystal lens as a whole.

For this reason, there is strong desire for technology able to achieve a uniform change of the refractive index without lowering the resolution, and achieve miniaturization of the optical system.

Accordingly, in light of the above circumstances, the present disclosure proposes an electric lens, an optical unit, and an imaging device enabling uniform change of the refractive index without lowering the resolution, and enabling miniaturization of the optical unit.

According to an embodiment of the present disclosure, there is provided an electric lens including: a first lens and a second lens adjacent to each other; and a variable-refractive-index body that is held between a lens face of the first lens and a lens face of the second lens mutually having the same curved surface, and changes refractive index according to an externally applied electrical signal. A thickness of the variable-refractive-index body is uniform in at least a portion that transmits a light ray contributing to image formation.

According to an embodiment of the present disclosure, there is provided an optical unit including: a lens group made up of one or a plurality of lenses. At least one lens among the lenses constituting the lens group is an electric lens including a first lens and a second lens adjacent to each other, and a variable-refractive-index body that is held between a lens face of the first lens and a lens face of the second lens mutually having the same curved surface, and changes refractive index according to an externally applied electrical signal, and a thickness of the variable-refractive-index body is uniform in at least a portion that transmits a light ray contributing to image formation.

According to an embodiment of the present disclosure, there is provided an imaging device including: an optical unit including a lens group made up of one or a plurality of lenses, and configured to transmit an image of an object positioned on one side of the lens group to another side of the lens group; and an image sensor configured to form the image of the object transmitted by the optical unit. At least one lens among the lenses constituting the lens group is an electric lens including a first lens and a second lens adjacent to each other, and a variable-refractive-index body that is held between a lens face of the first lens and a lens face of the second lens mutually having the same curved surface, and changes refractive index according to an externally applied electrical signal, and a thickness of the variable-refractive-index body is uniform in at least a portion that transmits a light ray contributing to image formation.

According to an embodiment of the present disclosure, a variable-refractive-index body of uniform thickness is held between the lens face of a first lens and the lens face of a second lens which mutually have the same curved surface. Consequently, when applying an electrical signal to the variable-refractive-index body, the change in the refractive index of the variable-refractive-index body is uniform for at least a portion that transmits light rays contributing to image formation, without leading to lowered resolution.

According to an embodiment of the present disclosure as described above, it is possible to obtain uniform change of the refractive index without lowering the resolution, and miniaturize the optical unit.

Note that the effects described above are not necessarily limited, and along with or instead of the effects, any effect that is desired to be introduced in the present specification or other effects that can be expected from the present specification may be exhibited.

DETAILED DESCRIPTION OF THE EMBODIMENT(S)

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Figure 1:
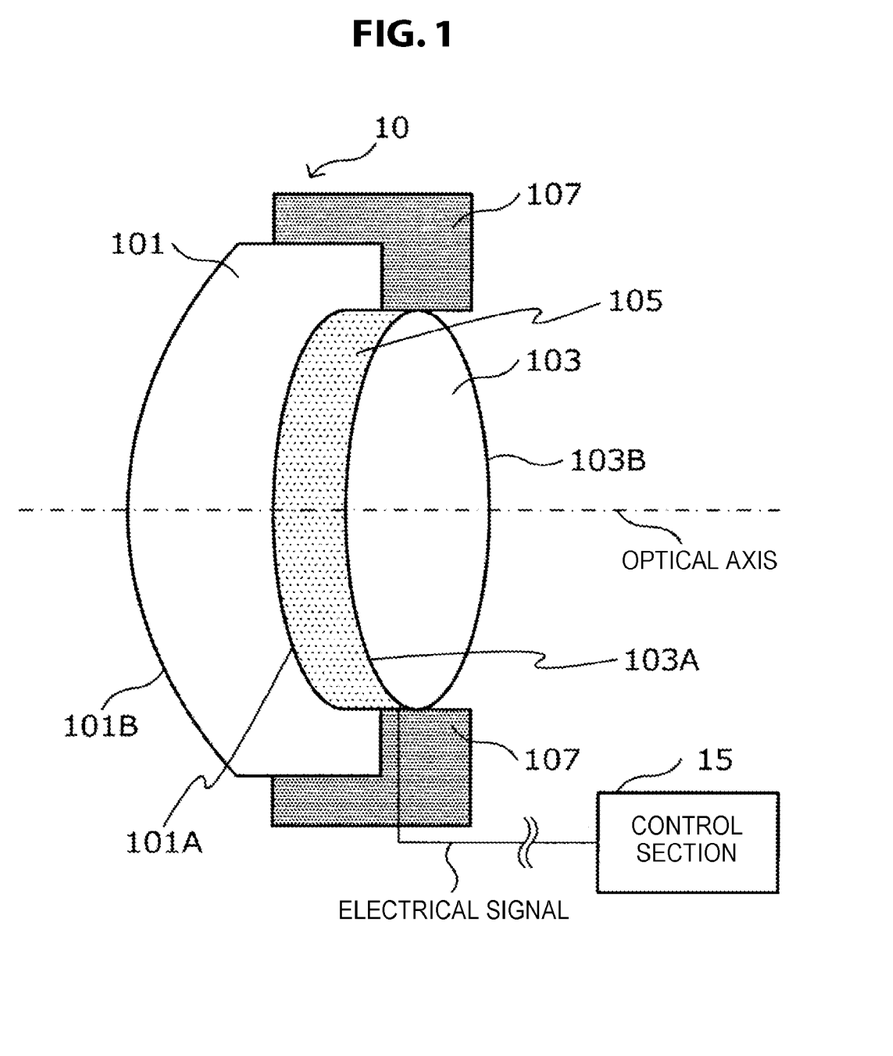
FIG. 1 is an explanatory diagram schematically illustrating a structure of an electric lens according to a first embodiment of the present disclosure.

Hereinafter, the description will proceed in the following order.
1. First Embodiment
1.1 Electric lens
1.2 Optical unit
1.3 Imaging device First Embodiment Electric Lens First, an electric lens according to a first embodiment of the present disclosure will be described in detail with reference to FIG. 1. FIG. 1 is an explanatory diagram that schematically illustrates a structure of the electric lens according to the first embodiment.

As schematically illustrated in FIG. 1, the electric lens 10 is made up of a first lens 101 and a second lens 103 which are adjacent to each other, and a variable-refractive-index body 105 held between a lens face 101A, which is the lens face of the first lens 101 that transmits light rays contributing to image formation, and a lens face 103A, which is the lens face of the second lens 103 that transmits light rays contributing to image formation. In addition, the electric lens 10 according to the present embodiment preferably includes an encapsulation member 107 that encapsulates the variable-refractive-index body 105.

In the electric lens 10 according to the present embodiment, the lens face 101A, which the lens face of the first lens 101 that transmits light rays contributing to image formation, and the lens face 103A, which is the lens face of the second lens 103 that transmits light rays contributing to image formation, are formed mutually having the same curved surface. In other words, one of either the lens face 101A or the second lens 103a has a convex face, while the other has a concave face, with each face having the same curvature. By making the lens face 101A and the lens face 103A at least have the same curved face mutually, the thickness (thickness in the optical axis direction) of the variable-refractive-index body 105 held in between by these lens faces 101A and 103A may be made uniform.

The shape of the first lens 101A in the first lens 101 and the shape of the lens face 103A in the second lens 103 are not particularly limited insofar as the two mutually have the same curved surface, and may be spherical faces or aspherical faces.

Note that the curvature of the lens faces in portions that do not transmit light rays contributing to image formation is not particularly limited, and the thickness of the variable-refractive-index body 105 corresponding to portions that do not transmit light rays contributing to image formation does not have to be uniform.

In addition, the shape of a lens face 101B, which is the lens face positioned on the opposite side from the lens face 101A in the first lens 101, and the shape of a lens face 103B, which is the lens face positioned on the opposite side from the lens face 103A in the second lens 103, are not particularly limited, and may be formed in a desired shape according to the demanded lens properties. The shapes of the lens face 101B and the lens face 103B are independent from each other and may be planar, spherical, or aspherical.

In addition, the material of the first lens 101 and the second lens 103 is not particularly limited, and established lens materials such as various types of optical glass, optical crystal, and plastic may be used.

The variable-refractive-index body 105, being held in between by the lens faces 101A and 103A mutually having the same curved surface, changes its refractive index according to an externally applied electrical signal. Such an electrical signal is applied to the variable-refractive-index body 105 from a control section 15 provided outside the electric lens 10 according to the present embodiment, via components such as various interconnects and a flexible printed circuit board.

In the electric lens 10 according to the present embodiment, as described above, the lens faces 101A and 103A that hold the variable-refractive-index body 105 in between mutually have the same curved surface. For this reason, the thickness in the optical direction of the variable-refractive-index body 105 is uniform, irrespectively of the position off the optical axis. Since the thickness in the optical direction of the variable-refractive-index body 105 is uniform, when an electrical signal is applied from outside, the refractive index of the variable-refractive-index body 105 overall is constant, irrespectively of the position off the optical axis. By making the refractive index of the variable-refractive-index body 105 vary uniformly, it becomes possible to electrically vary the focal length of the electric lens 10 as a whole, without changing the position on the optical axis of the electric lens 10 itself.

Herein, the thickness in the optical axis direction of the variable-refractive-index body 105 is able to achieve a higher refractive index value with increasing thickness, but if the refractive index value becomes too high, the resolution of the transmitted image is lowered. Accordingly, in the variable-refractive-index body 105 according to the present embodiment, although the specific value is not particularly limited, the thickness in the optical axis direction is preferably thin. Specifically, in the variable-refractive-index body 105 according to the present embodiment, it is preferable to suitably adjust the thickness in the optical axis direction of the variable-refractive-index body 105 and the magnitude of the electrical signal to apply so that the ratio of change in the focal length between the case of applying a maximum electrical signal and the case of not applying an electrical signal is approximately from 2:1 to 3:1. With this configuration, it becomes possible to vary the focal length of the electric lens 10 without leading to lowered resolution.

For the material used as the variable-refractive-index body 105, an arbitrary translucent material whose refractive index varies depending on an applied electrical signal may be used. Specifically, the variable-refractive-index body 105 according to the present embodiment may be formed using various types of liquid crystal and liquid lenses, for example. In addition, the material of the encapsulation member 107 is not particularly limited, and an arbitrary material may be used.

In the electric lens 10 according to the present embodiment as described above, the variable-refractive-index body 105 has a uniform thickness, and thus uniform change of the refractive index may be obtained without leading to lowered resolution. For this reason, by configuring an optical unit using such an electric lens 10, it is possible to further miniaturize the optical unit.

Note that the method of fabricating such an electric lens 10 is not particularly limited, and an established fabrication method may be applied. In other words, the first lens 101 and the second lens 103 may be manufactured on the basis of an established method, a variable-refractive-index body 105 as described above may be disposed between the lens face 101A of the first lens 101 and the lens face 103A of the second lens 103, and these three members may be affixed together by an established method. Additionally, the encapsulation member 107 may be provided to cover the edges of the variable-refractive-index body 105 and encapsulated the variable-refractive-index body 105 as appropriate.

The above thus describes an electric lens 10 according to the present embodiment in detail with reference to FIG. 1.

<Optical Unit>

Figure 2:
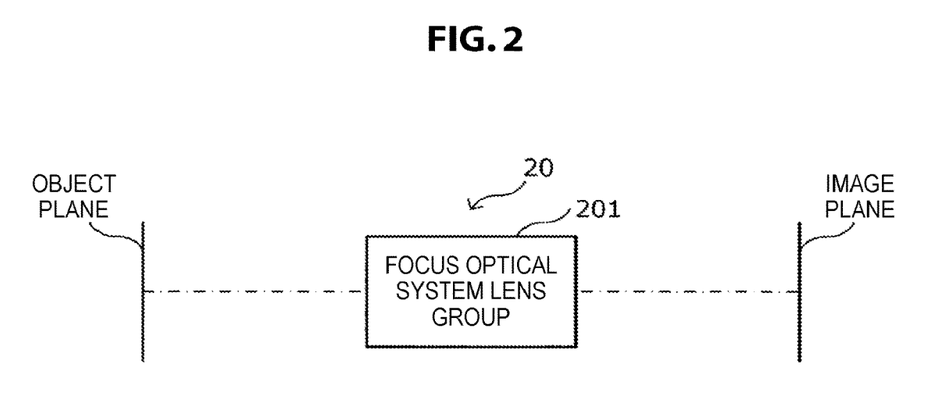
FIG. 2 is a block diagram schematically illustrating an example of a configuration of an optical unit provided with an electric lens according to the first embodiment.
Figure 3A:
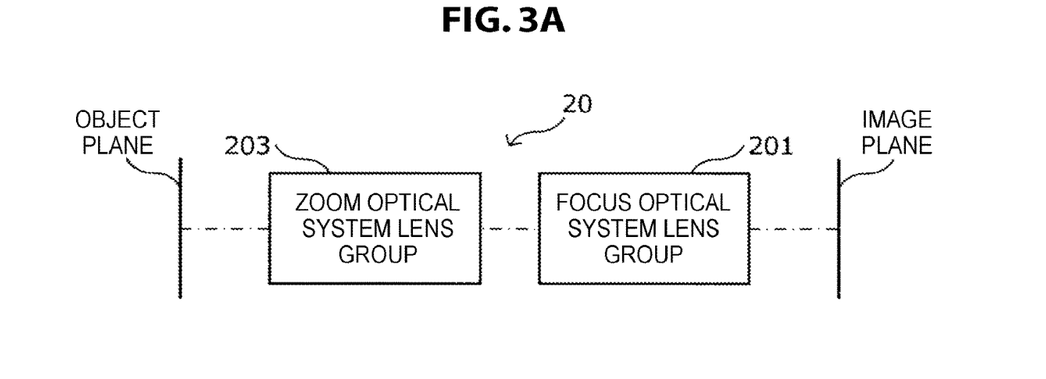
FIG. 3A is a block diagram schematically illustrating an example of a configuration of an optical unit provided with an electric lens according to the first embodiment.
Figure 3B:
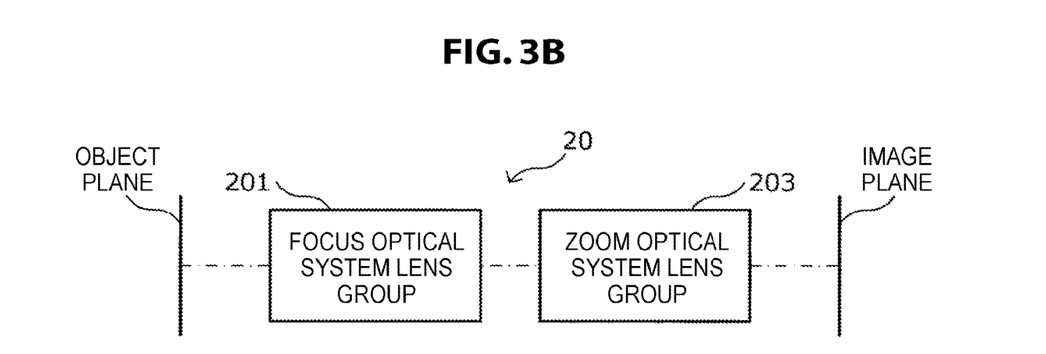
FIG. 3B is a block diagram schematically illustrating an example of a configuration of an optical unit provided with an electric lens according to the first embodiment.
Figure 4:
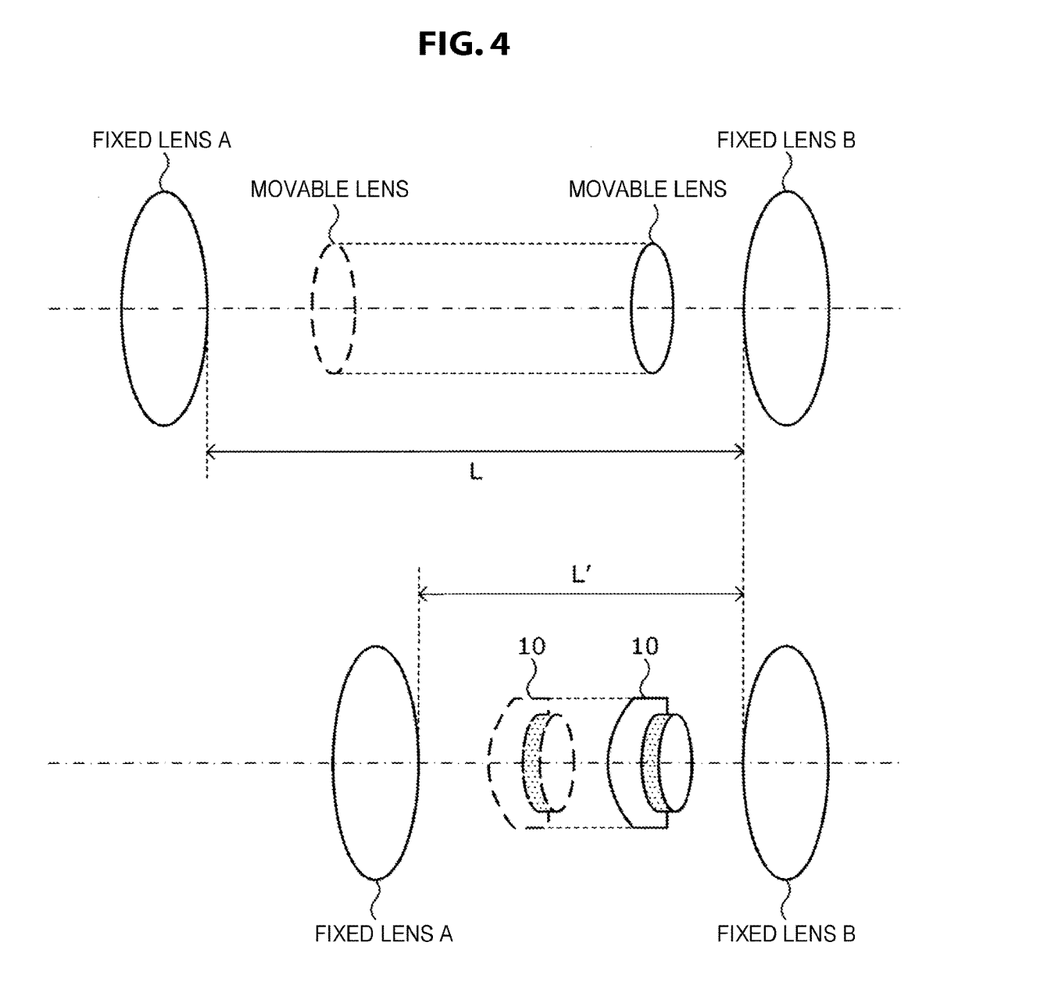
FIG. 4 is an explanatory diagram for explaining an optical unit provided with an electric lens according to the first embodiment.
Figure 5:
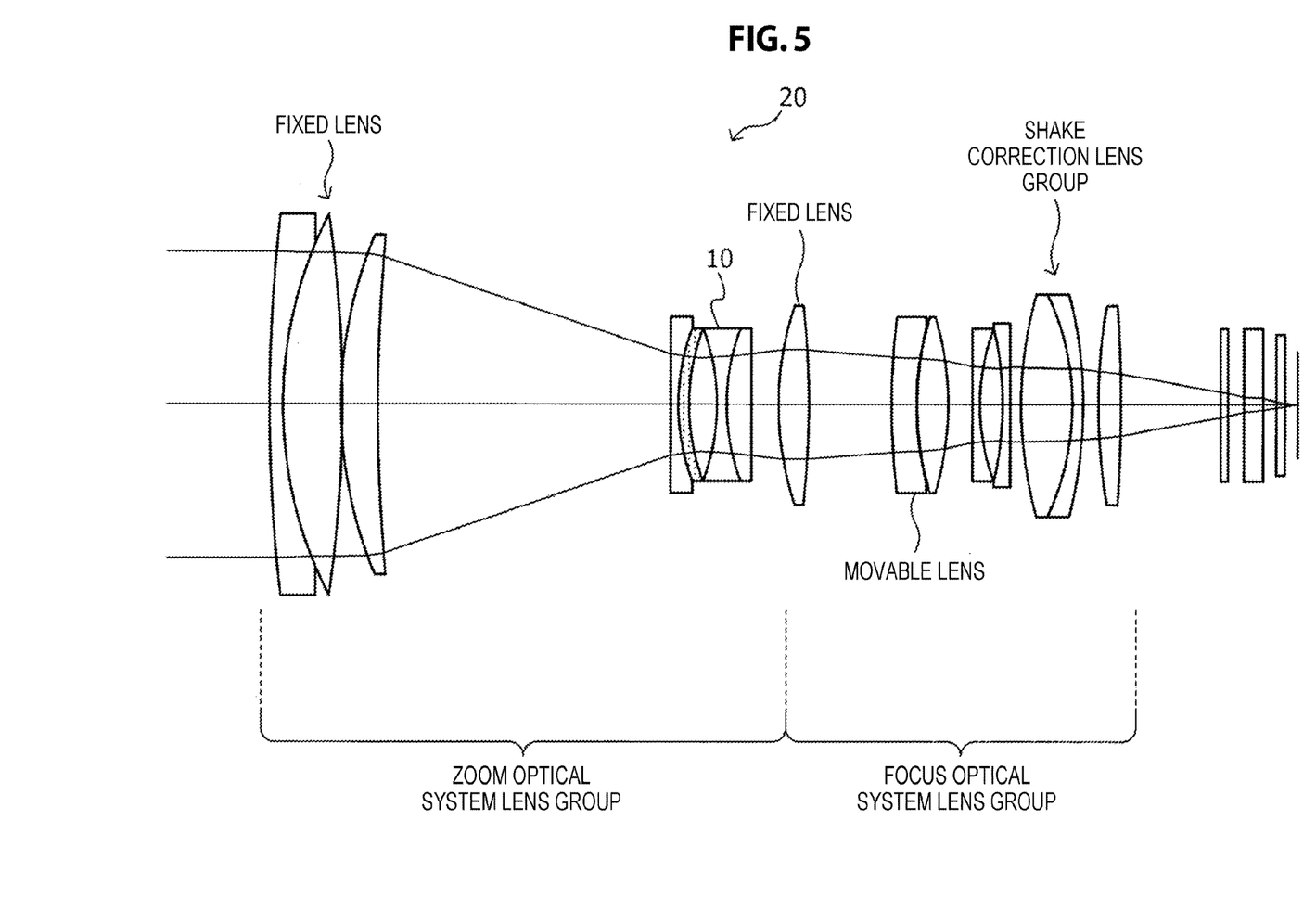
FIG. 5 is an explanatory diagram illustrating a specific example of an optical unit provided with an electric lens according to the first embodiment.
Figure 6:
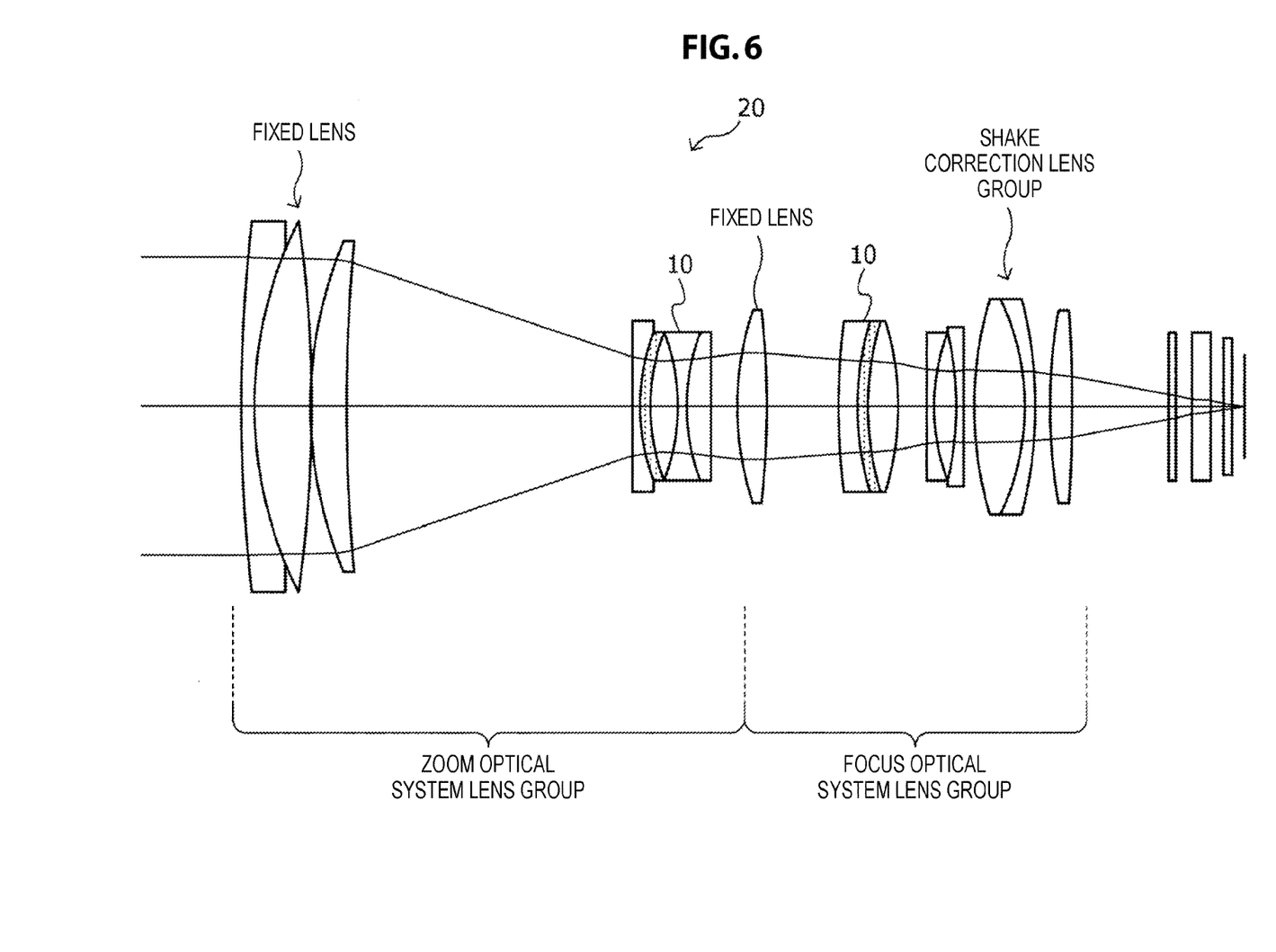
FIG. 6 is an explanatory diagram illustrating a specific example of an optical unit provided with an electric lens according to the first embodiment.

Next, an optical unit provided with an electric lens according to the present embodiment will be described in detail with reference to FIGS. 2 to 6. FIGS. 2 to 3B are block diagrams schematically illustrating an example of a configuration of an optical unit provided with an electric lens according to the present embodiment. FIG. 4 is an explanatory diagram for explaining an optical unit provided with an electric lens according to the present embodiment. FIGS. 5 and 6 are explanatory diagrams illustrating specific examples of an optical unit provided with an electric lens according to the present embodiment.

The electric lens 10 according to the present embodiment as described above may be applied to various types of optical units configured by combining fixed lenses and movable lenses. By having the variable-refractive-index body 105 operate appropriately, the electric lens 10 according to the present embodiment is able to vary the focal length to a degree, without causing the electric lens 10 itself to move. For this reason, by applying the electric lens 10 according to the present embodiment to various types of optical units configured by combining fixed lenses and movable lenses, the space reserved as the movable range of a movable lens may be reduced, enabling further miniaturization of the optical unit.

One example of an optical unit configured by combining fixed lenses and movable lenses is a single-focus optical unit 20 that does not include a zoom function, as schematically illustrated in FIG. 2, for example. The optical unit 20 includes a focus optical system lens group 201 for suitably focusing an image of an object positioned in the object plane onto the image plane.

In addition, another example of an optical unit configured by combining fixed lenses and movable lenses is an optical unit 20 for realizing a zoom function, as schematically illustrated in FIGS. 3A and 3B, for example. The optical unit 20 for realizing a zoom function as illustrated in FIGS. 3A and 3B includes a focus optical system lens group 201 for suitably focusing an image of an object onto the image plane, and a zoom optical system lens group 203 for enlarging the size of an image of an object positioned in the object plane. Such an optical unit 20 for realizing a zoom function may be an optical unit in which the zoom optical system lens group 203 is positioned on the object plane side of the focus optical system lens group 201, as illustrated in FIG. 3A, or an optical unit in which the zoom optical system lens group 203 is positioned on the image plane side of the focus optical system lens group 201, as illustrated in FIG. 3B.

In the optical unit 20 as illustrated in FIGS. 2 to 3B, a movable lens is disposed in a certain space inside the optical system (in FIG. 4, the space of length L between a fixed lens A and a fixed lens B), as schematically illustrated in the upper part of FIG. 4. By allowing the movable lens to move along the optical axis within the space of length L, the focus position is adjusted or the image magnification factor is adjusted.

In the electric lens 10 according to the present embodiment, the refractive index of the variable-refractive-index body 105 is varied, thereby achieving an effect similar to allowing a movable lens to move. However, if the desired state (such as the desired zoom magnification factor, for example) is not achieved with only variation in the refractive index of the variable-refractive-index body 105, the electric lens 10 according to the present embodiment may be disposed as a movable lens on the optical axis inside the optical unit 20, as illustrated in the lower part of FIG. 4. Consequently, the length L' of the region provided as the movable range of the movable lens may be made shorter than the length L set in the case of using a movable lens of the related art. As a result, by using the electric lens 10 according to the present embodiment, further miniaturization of the optical unit 20 may be achieved. Specifically, provided that the variable factor of the focal length achieved by the electric lens 10 is factor N, the length L' of the movable range becomes a factor (1/N) of L.

At this point, consider the case of providing the focus optical system lens group 201 as illustrated in FIG. 2 with the electric lens 10 according to the present embodiment. The movable range L of the movable lens originally disposed in the focus optical system lens group 201 is often set to a comparatively small value, given that the movable lens is used for adjusting the in-focus state of the image. Consequently, if the amount of movement of the movable lens demanded by the focus optical system lens group 201 may be substituted with just an amount of change in the refractive index of the variable-refractive-index body 105, the electric lens 10 may be disposed in the focus optical system lens group 201 as a fixed lens, and the focus optical system lens group 201 may be realized with fixed lenses only. As a result, an actuator does not have to be provided in the focus optical system lens group 201, vibrations that may be produced in the focus optical system lens group 201 may be reduced, and the occurrence of image blur may be minimized.

Next, consider the case of providing the zoom optical system lens group 203 as illustrated in FIGS. 3A and 3B with the electric lens 10 according to the present embodiment. In the zoom optical system lens group 203, the movable range L illustrated in the upper part of FIG. 4 is often set to a large value to achieve the desired zoom magnification factor. For this reason, when providing the electric lens 10 in such a zoom optical system lens group 203, the electric lens 10 is preferably disposed inside the zoom optical system lens group 203 as a movable lens. Consequently, by the effects of the amount of change in the refractive index achieved with the electric lens 10 and the physical movement of the electric lens 10 itself along the optical axis as a movable lens, the movable range L' may be made smaller while also achieving a high zoom magnification factor while maintaining resolution.

Note that in the optical unit 20 as illustrated in FIGS. 3A and 3B, disposing the electric lens 10 in the zoom optical system lens group 203 has a greater effect on the miniaturization of the optical unit 20 overall, but obviously the electric lens 10 may be disposed not only in the zoom optical system lens group 203 but also in the focus optical system lens group 201.

Next, the optical unit 20 according to the present embodiment will be described specifically with reference to the specific examples illustrated in FIGS. 5 and 6. The optical unit 20 illustrated in FIG. 5 is a specific example of an optical unit for realizing a zoom lens, and is made up of a focus optical system lens group provided on the upstream side of the image plane, and a zoom optical system lens group provided farther upstream from the focus optical system lens group.

Herein, the zoom optical system lens group is made up of two fixed lenses, and between these fixed lenses, the electric lens 10 movably disposed along the optical axis. An image of an object incident on the zoom optical system lens group from the left side of FIG. 5 is enlarged by change in the refractive index of the variable-refractive-index body 105 of the electric lens 10 and by the movement of the electric lens 10 itself along the optical axis, and is focused in front of the fixed lens positioned to the right of the electric lens 10 as seen in the drawing. After that, the enlarged image of the object is transmitted to the focus optical system lens group.

The focus optical system lens group illustrated in FIG. 5 is made up of components such as a fixed lens, a movable lens, and a shake correction lens group. With respect to the enlarged image of the object incident on the focus optical system lens group, the focused stated on the image plane is adjusted by the movable lens, image blur and the like due to camera shake is corrected by the shake correction lens group, and an image is focused onto the image plane.

In the zoom lens optical unit 20 as illustrated in FIG. 5, disposing the electric lens 10 according to the present embodiment in the zoom optical system lens group enables a reduction in the size of the movable range of the movable lens as illustrated in FIG. 4. As a result, it is possible to miniaturize the zoom optical system lens group while still achieving a zoom magnification factor like that of a larger zoom optical system lens group in the case of not using the electric lens 10 according to the present embodiment.

FIG. 6 illustrates a specific example of disposing the electric lens 10 according to the present embodiment not only in the zoom optical system lens group of the optical unit 20 for realizing a zoom lens illustrated in FIG. 5, but also in the focus optical system lens group. In the example illustrated in FIG. 6, the movable range of the electric lens 10 in the focus optical system lens group may be reduced similarly to the above. As a result, even further miniaturization of the optical unit 20 from the example illustrated in FIG. 5 becomes possible.

Note that although FIGS. 5 and 6 illustrate the case of disposing just one electric lens 10 according to the present embodiment in each of the optical system lens groups, the number of electric lenses 10 disposed in these optical system lens groups is not limited to one. As FIGS. 5 and 6 demonstrate, the lens groups constituting the optical unit 20 includes many instances of two adjacent lenses mutually having the same curved surface, which may be replaced by the electric lens 10 according to the present embodiment, such as the fixed lenses positioned farthest to the left in FIGS. 5 and 6, and the lenses constituting the shake correction lens group, for example. Obviously, such lenses which are replaceable by the electric lens 10 may be replaced by the electric lens 10 according to the present embodiment as appropriate, and multiple electric lenses 10 may exist in each optical system lens group.

The foregoing thus describes an optical unit provided with the electric lens 10 according to the present embodiment in detail with reference to FIGS. 2 to 6.

<Imaging Device>

Figure 7:
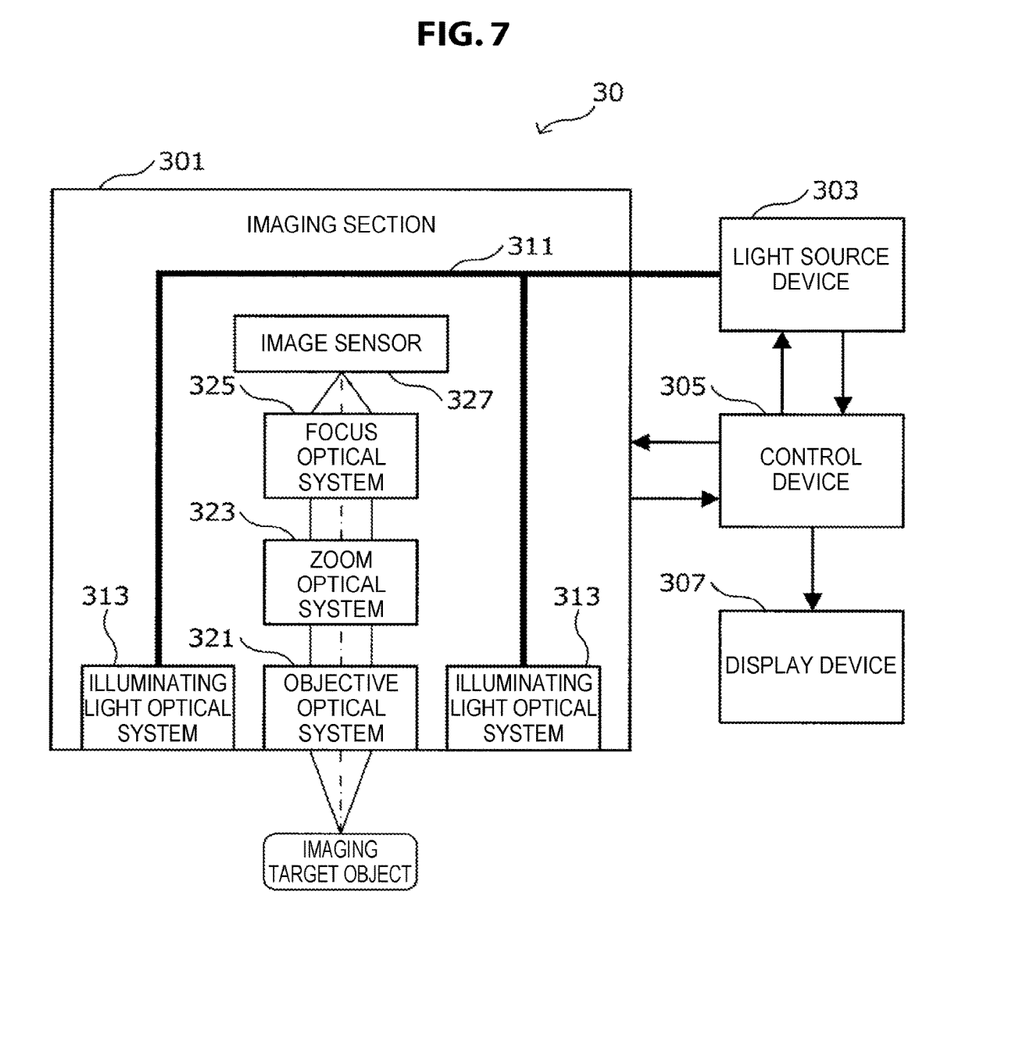
FIG. 7 is a block diagram schematically illustrating an example of an imaging device provided with an optical unit including an electric lens according to the first embodiment.
Figure 8:
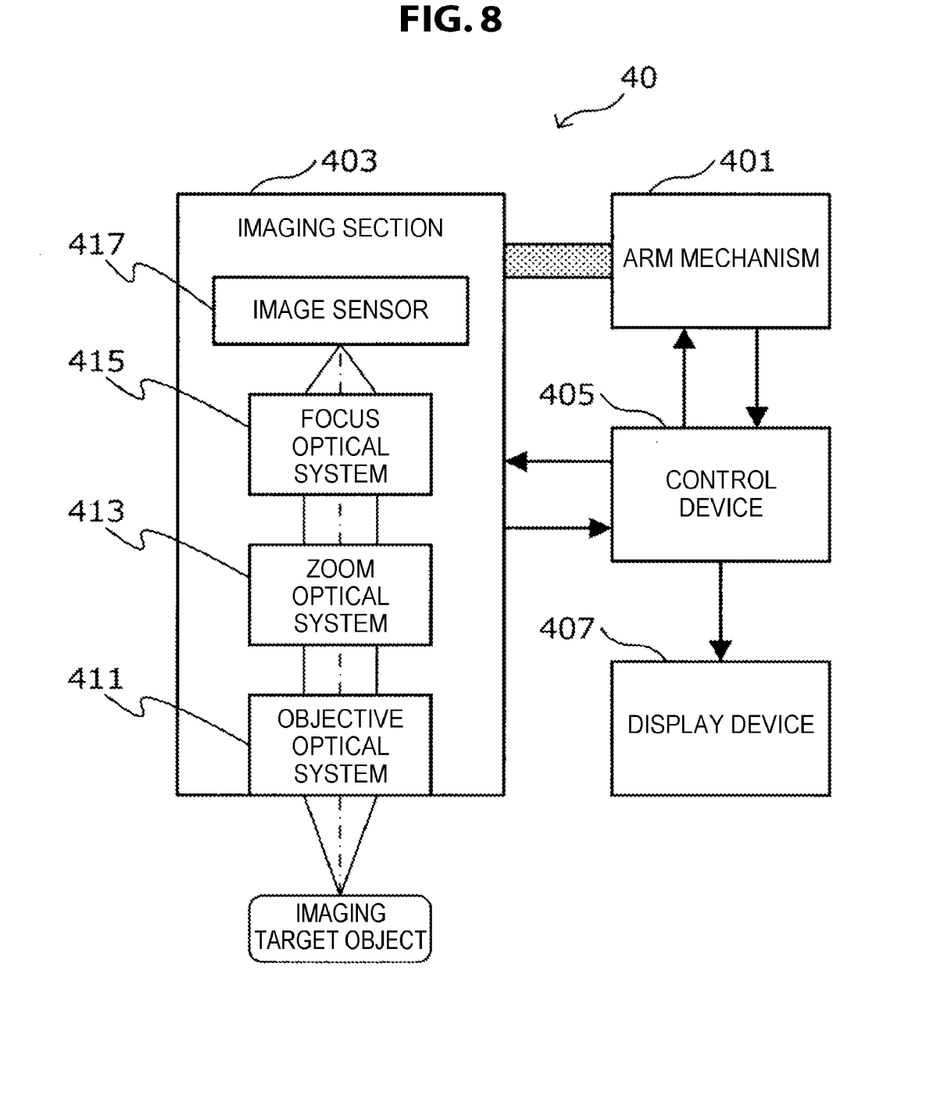
FIG. 8 is a block diagram schematically illustrating an example of an imaging device provided with an optical unit including an electric lens according to the first embodiment.

Next, an imaging device provided with an optical unit including the electric lens according to the present embodiment will be described simply with reference to FIGS. 7 and 8. FIGS. 7 and 8 are block diagrams schematically illustrating an example of an imaging device provided with an optical unit including an electric lens according to the first embodiment.

The electric lens 10 according to the present embodiment as described earlier may be applied to various imaging devices utilizing various types of optical units configured by combining fixed lenses and movable lenses. Such an imaging device may be an imaging device for medical use, such as an endoscopic device or a surgical microscope, or an imaging device for general use, such as a digital video camera or a digital still camera, for example.

As described above, since using the electric lens 10 enables further miniaturization of the optical unit 20, by applying the electric lens 10 to an imaging device such as a small digital video camera or a compact digital still camera, for example, further miniaturization of these imaging devices becomes possible.

Hereinafter, an endoscopic device and a surgical microscope will be taken as examples of an imaging device like the above to simply describe an imaging device according to the present embodiment.

[Endoscopic Device]

FIG. 7 is a block diagram schematically illustrating a configuration of an endoscopic device as part of an imaging device 30 to which the electric lens 10 and the optical unit 20 according to the present embodiment are applicable.

Endoscopic devices may be roughly divided into flexible endoscopic devices that use a fiber scope capable of taking on a flexible shape, in which various optical systems and an image sensor are disposed at the tip of such a fiber scope, and rigid endoscopic devices made up of a rigid tube in which various optical systems are disposed, and a camera unit connected to the rigid tube and provided with components such as an image sensor. The electric lens 10 and the optical unit 20 according to the present embodiment may be applied suitably to either of such flexible endoscopic devices and rigid endoscopic devices.

As illustrated in FIG. 6, the imaging device 30 as typified by such endoscopic devices primarily includes an imaging section 301 for capturing an image of the imaging target object (in many cases, various organs positioned inside the body), a light source device 303, a control device 305, and a display device 307.

The imaging section 301 is the portion that captures an enlarged image of the imaging target object, and includes a bundle fiber 311 that transmits illuminating light emitted from the light source device 303, an illuminating light optical system 313 for shining illuminating light onto the imaging target object, an objective optical system 321, a zoom optical system 323, a focus optical system 325, and an image sensor 327. The operation of the imaging section 301 is controlled by the control device 305 discussed later.

Reflected light from the imaging target object out of the illuminating light radiated from the illuminating light optical system 313 passes through the objective optical system 321 to enter the imaging section 301, passes through the zoom optical system 323 and the focus optical system 325, and forms an image on an image sensor 327 which may be any of various established types, such as a charge-coupled device (CCD) sensor or a complementary metal-oxide-semiconductor (CMOS) sensor. The captured image of the imaging target object converted into an electrical signal by the image sensor 327 is output to the control device 305 discussed later.

The light source device 303 is a light source that produces illuminating light used to capture an image of an imaging target object. The operation of the light source device 303 is controlled by the control device 305 discussed later. Illuminating light emitted from the light source device 303 is transmitted to the imaging section 301 via the bundle fiber 311 in which multiple optical fibers are bundled together.

The control device 305 is a device configured as a computer or the like realized by components such as a central processing unit (CPU), read-only memory (ROM), random access memory (RAM), an input device, an output device, and a storage device, and centrally controls the operation of the imaging device 30 overall. The control device 305 controls the general operation of the imaging section 301 and the light source device 303 above as well as the display device 307 discussed later, while also performing various types of image processing as appropriate on a captured image output from the imaging section 301, and then outputting the obtained captured image to the display device 307 discussed later.

The display device 307 is an example of an output device realized by any of various types of displays or the like, and displays an image of an imaging target objected captured by the imaging section 301 on a display screen, under control by the control device 305. Consequently, a user of the imaging device 30 according to the present embodiment (in other words, various types of endoscopic devices) is able to check the picture of the imaging target object on the spot.

The electric lens 10 and the optical unit 20 according to the present embodiment may be applied to the imaging section 301 of the imaging device 30 as typified by an endoscopic device having a configuration like the above. In other words, the electric lens 10 according to the present embodiment may be installed as a substitute for a movable lens constituting the zoom optical system 323 or the focus optical system 325, thereby enabling further miniaturization of the imaging section 301. At this point, the refractive index of the variable-refractive-index body 105 of the electric lens 10 is controlled on the basis of an electrical signal output from the control device 305.

Note that FIG. 7 illustrates the case in which the zoom optical system 323 is positioned in front of the focus optical system 325, but as discussed earlier, an optical unit made up of the objective optical system 321, the focus optical system 325, the zoom optical system 323, and the image sensor 327 in that order obviously may also be realized.

The above thus simply describes an endoscopic device to which the electric lens 10 and the optical unit 20 according to the present embodiment are applicable.

[Surgical Microscope]

FIG. 8 is a block diagram schematically illustrating a configuration of a surgical microscope as part of an imaging device 30 to which the electric lens 10 and the optical unit 20 according to the present embodiment are applicable.

The surgical microscope is a device used to perform surgery while observing an enlarged view of a tiny surgical site. The surgical microscope captures an enlarged image of the surgical site, and outputs the captured picture to a display device. Consequently, the surgeon becomes able to perform surgery while observing the enlarged image of the surgical site.

As illustrated in FIG. 8, an imaging device 40 as typified by such a surgical microscope primarily includes an arm mechanism 401, an imaging section 403, a control device 405, and a display device 407.

The arm mechanism 401 is realized by connecting multiple balance arms to each other with joints. The imaging section 403 discussed later is provided at the tip of the multiple balance arms. The operation of such an arm mechanism 401 is controlled by the control device 405 discussed later. Also, by additionally providing a counterweight to the arm mechanism 401, the surgeon using the surgical microscope becomes able to move the imaging section 403 discussed later as though the arm mechanism 401 were weightless. Such an arm mechanism 401 is not particularly limited, and various types of arm mechanisms having various structures may be applied as appropriate.

The imaging section 403 is provided at the tip of the arm mechanism 401, and is the portion that captures an enlarged image of the surgical site. As schematically illustrated in FIG. 8, the imaging section 403 includes an objective optical system 411, a zoom optical system 413, a focus optical system 415, and an image sensor 417. The operation of the imaging section 403 is controlled by the control device 405 discussed later.

An image of an imaging target object passes through the objective optical system 411 to enter the imaging section 403, passes through the zoom optical system 413 and the focus optical system 415, and is focused onto the image sensor 417 which may be any of various established types of image sensors, such as a CCD sensor or a CMOS sensor. The captured image of the imaging target object converted into an electrical signal by the image sensor 417 is output to the control device 405 discussed later.

The control device 405 is a device configured as a computer or the like realized by components such as a CPU, ROM, RAM, an input device, an output device, and a storage device, and centrally controls the operation of the imaging device 40 overall. The control device 405 controls the general operation of the arm mechanism 401 and the imaging section 403 above as well as the display device 307 discussed later, while also performing various types of image processing as appropriate on a captured image output from the imaging section 403, and then outputting the obtained captured image to the display device 407 discussed later.

The display device 407 is an example of an output device realized by any of various types of displays or the like, and displays an image of an imaging target object captured by the imaging section 403 on a display screen, under control by the control device 405. Consequently, a user of the imaging device 40 according to the present embodiment (in other words, various types of surgical microscopes) is able to check the picture of the imaging target object on the spot.

The electric lens 10 and the optical unit 20 according to the present embodiment may be applied to the imaging section 403 of the imaging device 40 as typified by a surgical microscope having a configuration like the above. In other words, the electric lens 10 according to the present embodiment may be installed as a substitute for a movable lens constituting the zoom optical system 413 or the focus optical system 415, thereby enabling further miniaturization of the imaging section 403. At this point, the refractive index of the variable-refractive-index body 105 of the electric lens 10 is controlled on the basis of an electrical signal output from the control device 405.

Note that FIG. 8 illustrates the case in which the zoom optical system 413 is positioned in front of the focus optical system 415, but as discussed earlier, an optical unit made up of the objective optical system 411, the focus optical system 415, the zoom optical system 413, and the image sensor 417 in that order obviously may also be realized.

The above thus simply describes a surgical microscope to which the electric lens 10 and the optical unit 20 according to the present embodiment are applicable.

It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to an embodiment of the present disclosure can exhibit other effects that are evident to those skilled in the art along with or instead of the effects based on the present specification.

Additionally, the present technology may also be configured as below.

(1) An electric lens including:
 a first lens and a second lens adjacent to each other; and
 a variable-refractive-index body that is held between a lens face of the first lens and a lens face of the second lens mutually having the same curved surface, and changes refractive index according to an externally applied electrical signal, wherein
 a thickness of the variable-refractive-index body is uniform in at least a portion that transmits a light ray contributing to image formation.

(2) The electric lens according to (1), wherein
 the variable-refractive-index body is a liquid crystal lens or a liquid lens.

(3) The electric lens according to (1) or (2), wherein
 a ratio of change in focal length between a case of applying a maximum electrical signal to the variable-refractive-index body and a case of not applying an electrical signal is from 2:1 to 3:1.

(4) An optical unit including:
 a lens group made up of one or a plurality of lenses, wherein
 at least one lens among the lenses constituting the lens group is an electric lens including
  a first lens and a second lens adjacent to each other, and
  a variable-refractive-index body that is held between a lens face of the first lens and a lens face of the second lens mutually having the same curved surface, and changes refractive index according to an externally applied electrical signal, and
  a thickness of the variable-refractive-index body is uniform in at least a portion that transmits a light ray contributing to image formation.

(5) The optical unit according to (4), wherein
 the electric lens is disposed having a variable installation position inside the lens group.

(6) The optical unit according to (5), wherein
 the optical unit includes a zoom optical system lens group configured to adjust an optical magnification factor, and
 the electric lens is provided as a lens constituting the zoom optical system lens group.

(7) The optical unit according to (5), wherein
 the optical unit includes a focus optical system lens group configured to adjust a focus position, and
 the electric lens is provided as a lens constituting the focus optical system lens group.

(8) The optical unit according to (5), wherein
 the optical unit includes a zoom optical system lens group configured to adjust an optical magnification factor and a focus optical system lens group configured to adjust a focus position, and
 the electric lenses are provided as a lens constituting the zoom optical system lens group and a lens constituting the focus optical system lens group.

(9) An imaging device including:
 an optical unit including a lens group made up of one or a plurality of lenses, and configured to transmit an image of an object positioned on one side of the lens group to another side of the lens group; and
 an image sensor configured to form the image of the object transmitted by the optical unit, wherein
 at least one lens among the lenses constituting the lens group is an electric lens including
  a first lens and a second lens adjacent to each other, and
  a variable-refractive-index body that is held between a lens face of the first lens and a lens face of the second lens mutually having the same curved surface, and changes refractive index according to an externally applied electrical signal, and
  a thickness of the variable-refractive-index body is uniform in at least a portion that transmits a light ray contributing to image formation.

(10) The imaging device according to (9), wherein
 the imaging device is an endoscopic device or a surgical microscope.

(11) The imaging device according to (9), wherein
 the imaging device is a digital video camera or a digital still camera.

What is claimed is:

1. An electric lens comprising:
a first lens and a second lens adjacent to each other; and
a variable-refractive-index body that is held between a first lens surface of the first lens and a second lens surface of the second lens, the first lens surface and the second lens surface are each curved surfaces having a same amount of curve, and changes refractive index according to an externally applied electrical signal, wherein
a thickness of the variable-refractive-index body between the first lens surface and the second lens surface is constant over an entirety of an area that transmits a light ray contributing to image formation,
wherein the first lens surface is concave and the second lens surface is convex.

2. The electric lens according to claim 1, wherein
the variable-refractive-index body is a liquid crystal lens or a liquid lens.

3. The electric lens according to claim 1, wherein
a ratio of change in focal length between a case of applying a maximum electrical signal to the variable-refractive-index body and a case of not applying an electrical signal is from 2:1 to 3:1.

4. An optical unit comprising:
a lens group made up of one or a plurality of lenses, wherein
at least one lens among the lenses constituting the lens group is an electric lens including
a first lens and a second lens adjacent to each other, and
a variable-refractive-index body that is held between a first lens surface of the first lens and a second lens surface of the second lens, the first lens surface and the second lens surface are each curved surfaces having a same amount of curve, and changes refractive index according to an externally applied electrical signal, wherein
a thickness of the variable-refractive-index body between the first lens surface and the second lens surface is constant over an entirety of an area that transmits a light ray contributing to image formation,
wherein the first lens surface is concave and the second lens surface is convex.

5. The optical unit according to claim 4, wherein
the electric lens is disposed having a variable installation position inside the lens group.

6. The optical unit according to claim 5, wherein
the optical unit includes a zoom optical system lens group configured to adjust an optical magnification factor, and the electric lens is provided as a lens constituting the zoom optical system lens group.

7. The optical unit according to claim 5, wherein
the optical unit includes a focus optical system lens group configured to adjust a focus position, and
the electric lens is provided as a lens constituting the focus optical system lens group.

8. The optical unit according to claim 5, wherein
the optical unit includes a zoom optical system lens group configured to adjust an optical magnification factor and a focus optical system lens group configured to adjust a focus position, and
the electric lenses are provided as a lens constituting the zoom optical system lens group and a lens constituting the focus optical system lens group.

9. An imaging device comprising:
an optical unit including a lens group made up of one or a plurality of lenses, and configured to transmit an image of an object positioned on one side of the lens group to another side of the lens group; and
an image sensor configured to form the image of the object transmitted by the optical unit, wherein
at least one lens among the lenses constituting the lens group is an electric lens including
a first lens and a second lens adjacent to each other; and
a variable-refractive-index body that is held between a first lens surface of the first lens and a second lens surface of the second lens, the first lens surface and the second lens surface are each curved surfaces having a same amount of curve, and changes refractive index according to an externally applied electrical signal, wherein
a thickness of the variable-refractive-index body between the first lens surface and the second lens surface is constant over an entirety of an area that transmits a light ray contributing to image formation,
wherein the first lens surface is concave and the second lens surface is convex.

10. The imaging device according to claim 9, wherein
the imaging device is an endoscopic device or a surgical microscope.

11. The imaging device according to claim 9, wherein
the imaging device is a digital video camera or a digital still camera.

12. The electric lens according to claim 1, wherein
the first lens surface and the second lens surface each have a amount of curve that is greater than zero.

* * * * *